Oct. 5, 1926.
A. W. JOHNSON
1,602,112
TRUCK LOADING APPARATUS
Filed March 26, 1925      3 Sheets-Sheet 2
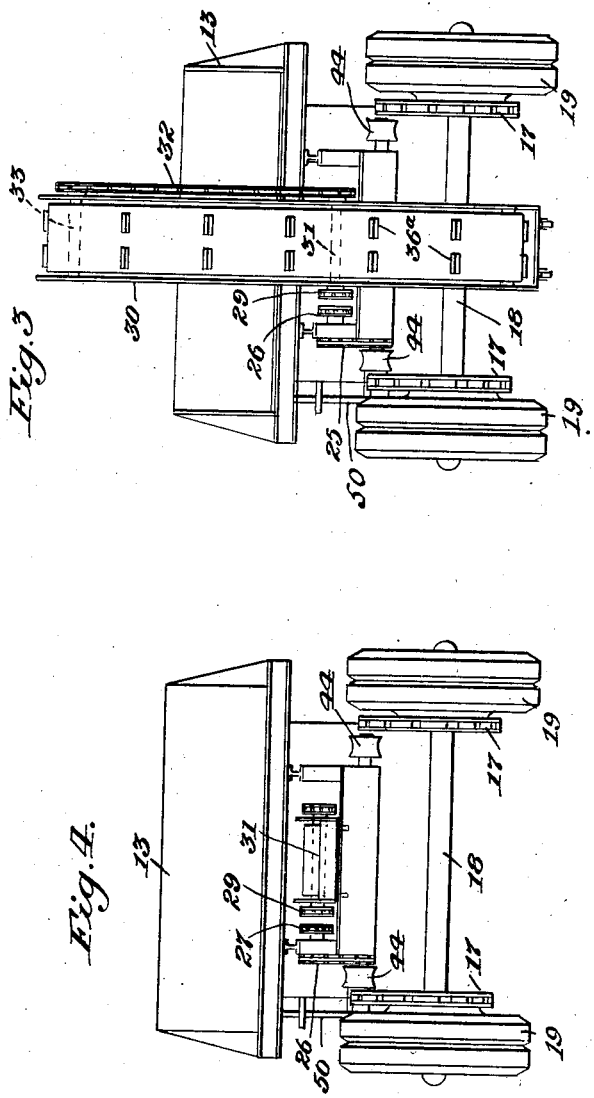
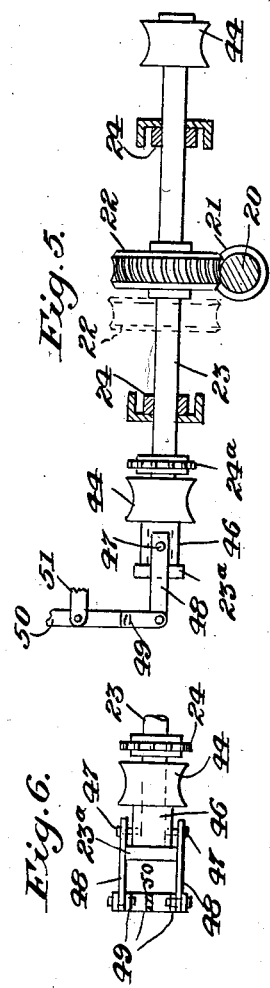

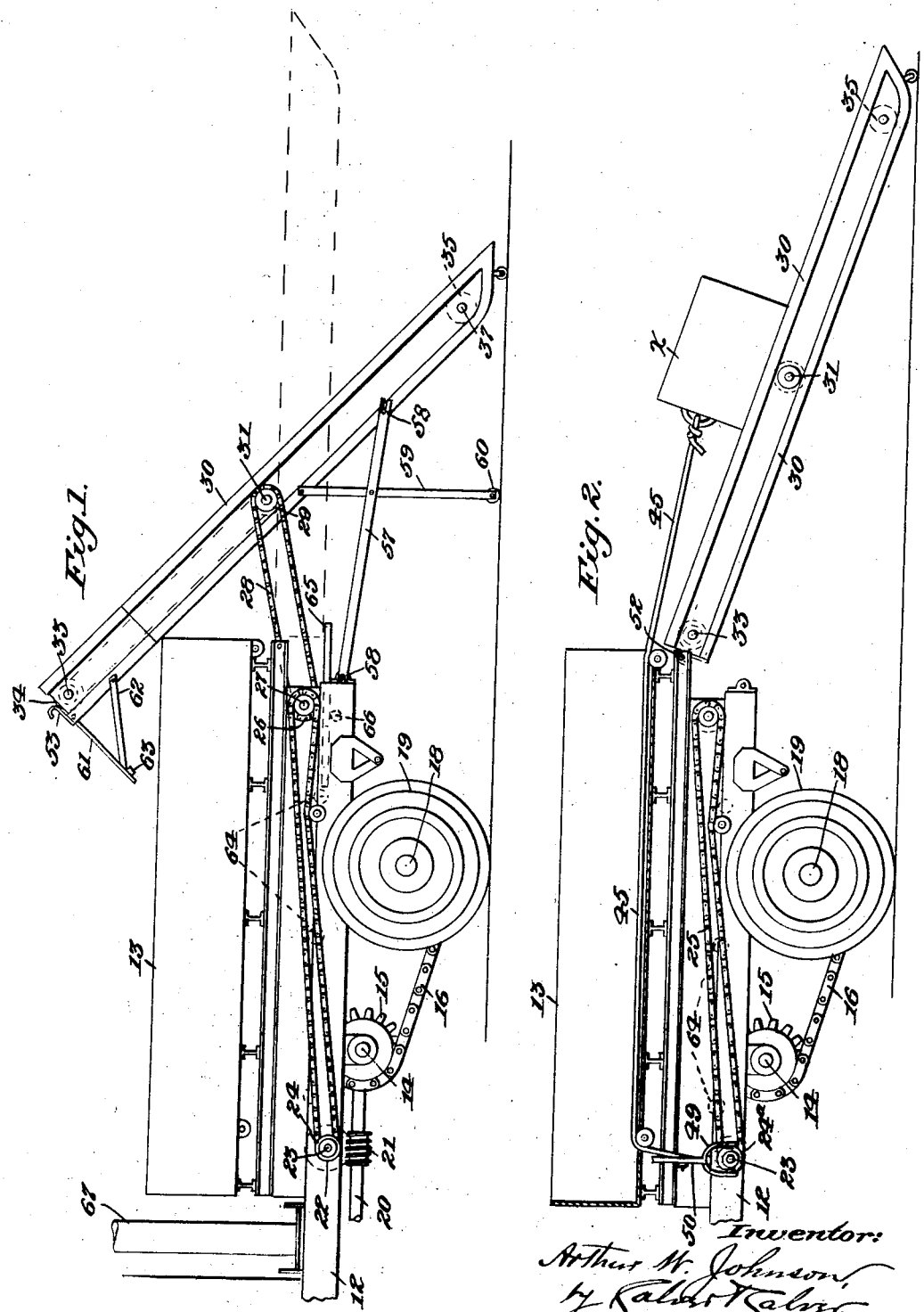

Oct. 5, 1926.
A. W. JOHNSON
TRUCK LOADING APPARATUS
Filed March 26, 1925  3 Sheets-Sheet 3
1,602,112
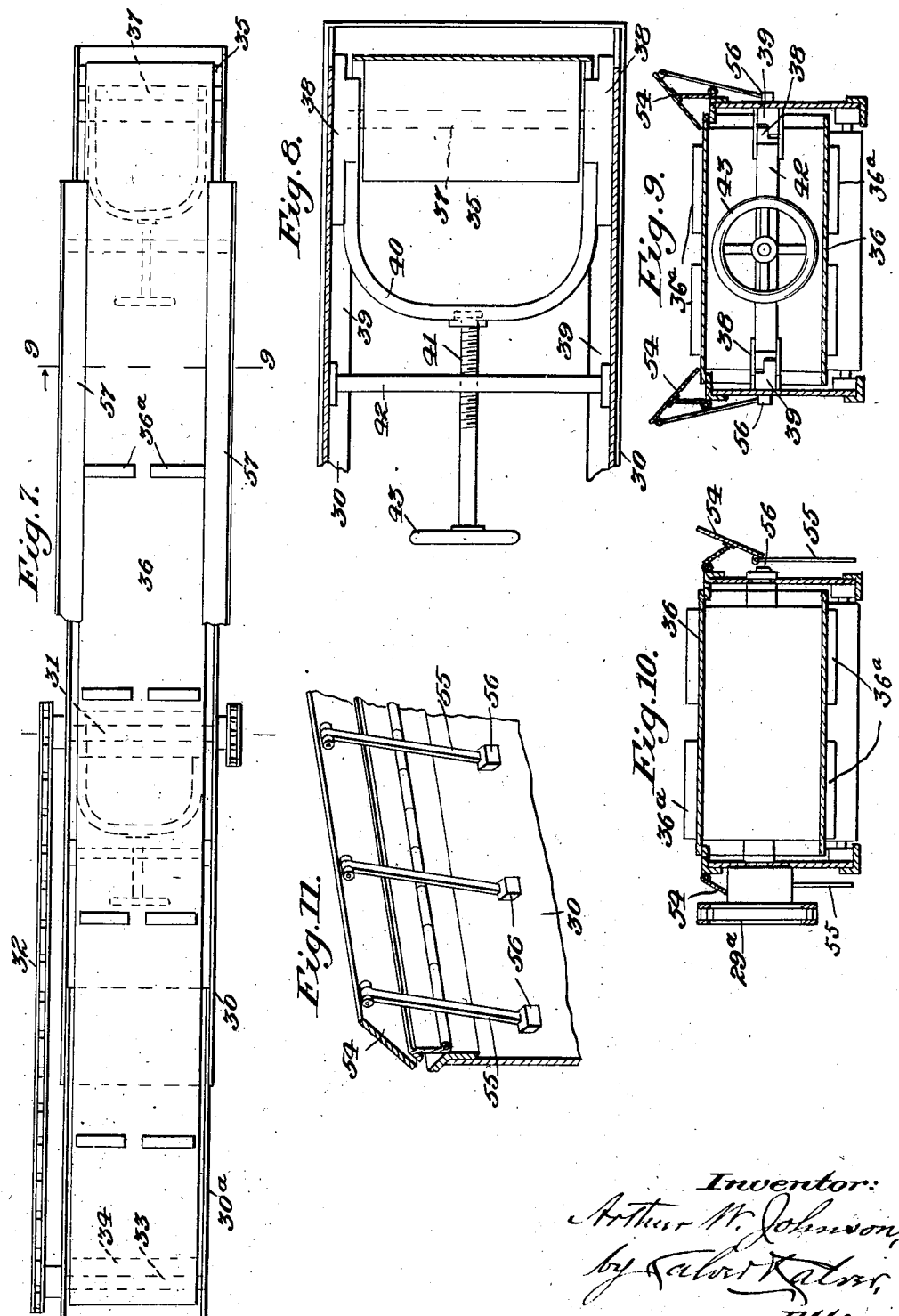
Inventor:
Arthur W. Johnson,
by (signature)
Att'ys.

Patented Oct. 5, 1926.

1,602,112

UNITED STATES PATENT OFFICE.

ARTHUR W. JOHNSON, OF ANNAPOLIS, MARYLAND, ASSIGNOR OF FORTY-NINE ONE-HUNDREDTHS TO FREDERICK PETRY, OF ANNAPOLIS, MARYLAND.

TRUCK-LOADING APPARATUS.

Application filed March 26, 1925. Serial No. 18,450.

This invention relates to a truck loading apparatus and has for its object to provide a convenient construction whereby different kinds of materials may be loaded into the box part or on to the platform of a truck by mechanism operated from a motor-driven power-shaft. The invention comprises a suitable truck construction whereby a loading frame with its power-driven conveyor may be housed beneath the box portion or platform of a truck when not in use, all as will hereinafter more fully appear.

In the accompanying drawings Fig. 1 is an elevation illustrating the invention with the loading frame arranged for loading loose material into the box of a truck. Fig. 2 is a similar view showing the parts disposed for the purpose of loading a heavy body into the box or on to the platform of a truck. Fig. 3 is an end view looking from the right of Fig. 1, showing the loading frame in working position. Fig. 4 is a view similar to Fig. 3, but showing the loading frame stored beneath the box of the truck. Fig. 5 is a detail view showing the driving connection for the conveyor of the loading frame with the motor driven shaft, and also the means whereby the conveyor driving worm wheel may be disconnected from the motor driven shaft when the truck is being driven on the road. Fig. 6 is a plan view of some of the parts shown in elevation in Fig. 5. Fig. 7 is a detail plan view of the loading frame and its endless conveyor. Fig. 8 is a detail view of the tension adjusting device for the endless belt conveyor. Fig. 9 is a cross section on line 9—9, Fig. 7, showing the belt tension adjusting devices and the side-boards of the loading frame in working position for handling loose material. Fig. 10 is a cross section of the loading frame showing at its right hand side the position of one of the side-boards of the loading frame when not in use. Fig. 11 is a detail view showing means for supporting one of the side-boards when in operative position.

Referring to the drawings, 12 denotes a part of the chassis of a truck on which is suitably mounted a box or receptacle portion 13. Beneath the chassis is mounted a motor driven shaft 14 having sprocket wheels 15 connected by chains 16 with sprocket wheels at 17 on a shaft 18 to which are attached truck driving wheels 19. Connected to the shaft 14, by gears or in any other suitable manner, is a power shaft 20 provided with a worm 21 meshing with a worm wheel 22 on a shaft 23 mounted in suitable bearings 24 on the chassis. The shaft 23 is endwise adjustable, as will be hereinafter explained, so as to throw the worm wheel 22 into and out of engagement with the worm 20 when the truck is being driven on the road.

The shaft 23 is provided with a sprocket wheel 24ª connected by a chain 25 with a sprocket wheel 26 on a shaft 27, said sprocket wheel 26 being connected by a chain 28 with a sprocket wheel 29 on the truck loading frame 30. The sprocket wheel 29 is carried by a shaft 31 suitably mounted in the loading frame 30 and carries a second sprocket wheel 29ª connected by a chain 32 with a sprocket wheel on a shaft 33 to which is fixed a roller 34. Mounted near the opposite end of the loading frame is a second roller 35, and an endless conveyor belt 36 runs over the rollers 34 and 35 and is driven by the roller 34. The roller 35 rotates on a shaft 37 having bearings in side bars 38 which are slidingly mounted on longitudinal bars 39 forming part of the conveyor frame. The roller 35 may be adjusted to place the belt 36 under suitable tension by means of a forked yoke 40 to which is swivelled a screw 41 mounted on a cross bar 42 and provided with a hand wheel 43 which may be turned in either direction to adjust the roller 35 as may be desired. The belt 36 is preferably provided with cross cleats or slats 36ª to engage loose material to be loaded.

Fixed to the shaft 23 are pulleys 44 around which a rope 45 may be given several turns when it is desired to use either one of said pulleys as a winch or capstan in drawing a heavy article, as block $x$, up the side bars of the loading frame, as shown in Fig. 2, into the truck box or onto the truck platform.

Between one of the winch or capstan pulleys 44 and a head 23ª on the shaft 23 is a sleeve or collar 46 to which are jointed, by means of pins or rivets 47, the inner ends of links 48 the outer ends of which are jointed to a fork 49 at the lower end of a lever 50, pivoted on a support 51 and which lever, in practice, will be extended upward so that its upper end will be conveniently accessible to the driver of the truck when it is desired to shift the shaft 23 endwise for the purpose of engaging the worm wheel 22 with the worm 21, or for disengaging it from said worm, as shown in dotted lines in Fig. 5.

The loading frame is preferably provided with pivotally mounted side-boards 54 overlapping the side edges of the conveyor belt 36 so as to prevent loose material from falling down sidewise from said belt, the said side-boards being provided with hinged props 55 the lower ends of which may rest on the lugs 56 at the sides of the loading frame, as shown in Figs. 9 and 11, when the said side-boards are in working position, but when it is desired to throw the said side-boards out of working position, as shown in Fig. 10, the said props will be removed from their supporting lugs and the said side-boards may be lowered to the position best shown at the right of Fig. 10.

To steady the loading frame when in position for loading loose material, as shown in Fig. 1, a brace 57 having forked ends to engage rods or pins 58 on the chassis and loading frame will preferably be provided, this brace being pivoted to a prop 59 pivoted to the loading frame, said prop being preferably provided at its lower end with a wheel 60. When the loading frame is not in use and is to be stored beneath the floor of the truck the brace 57 and prop 59 may be folded together out of the way.

It will be noted that when the loading frame 30 is in position for loading loose material, as shown in Fig. 1, its upper end is supported on the box 13, said upper end overlapping said box so as to discharge loose material into said box, and when in this position the lower end of said frame is close to the ground so as to pick up loose material from the ground or a floor. In this loading position the loading frame is held against the truck box by draft on the chain 28, said frame being steadied in its working position by the prop or props 59 and brace or braces 57. The frame of the truck is provided with a cross rod 52 and the upper end of the loading frame is provided with hooks 53 so that when heavy articles are to be loaded the upper end of said loading frame will be approximately on a level with the platform of the truck, while its lower end will be close to the ground so that heavy articles may be readily placed on said loading frame.

It will be noted that between the lower part of the chassis 12 and the box 13 of the truck a considerable space is provided, this space being of sufficient size to receive the loading frame which may be disengaged from either of the working positions shown in Figs. 1 and 2, and then slid into the storing space as shown in Fig. 4. In thus storing the loading frame away the sprocket chain 28 will first be loosened and then removed, and this will enable the parts to be stored away without difficulty.

The loading frame is preferably provided at its loading end with a hinged shield 61 which may be held in working position, as shown in Fig. 1, by means of a brace 62 pivotally attached at its inner end to the loading frame and resting at its outer end on a lug 63 on the said shield. This construction enables the shield and its brace or braces to be folded in out of the way when the loading frame is to be stored on the chassis beneath the truck box or platform.

Mounted on the chassis frame are rollers 64 which will facilitate running the loading frame in or out beneath the truck box or platform, and at the rear end of the chassis frame are slides 65 which may be pulled out, as shown in Fig. 1, when the loading frame is to be lowered down as shown in dotted lines in Fig. 1, for the purpose of running it in beneath the box of the truck. These slides will preferably run on rollers 66. The loading frame 30 preferably comprises an auxiliary frame portion 30ª which may be telescoped into the main frame part to shorten the loading frame when it is to be stored on the chassis beneath the truck platform or floor of the truck box. In thus shortening the loading frame the sprocket chain 32 will of course be loosened and taken off, as hereinbefore stated. An adjusting or tensioning device, similar to that shown in Fig. 8 for the conveyor belt, will preferably be employed for tightening or loosening the sprocket chain 32, as denoted by dotted lines in Fig. 7.

In Fig. 1 is shown a "hoist" 67 such as is usually used in dump trucks, but which, however, forms no part of the present invention.

From the foregoing it will be understood that the invention provides an efficient power-driven truck loading construction adapted for loading heavy articles as well as for loading loose material, and also provides a convenient construction whereby the loading frame may be easily stored for transportation when not in use, as well as means for connecting the loading mechanism with a power driven shaft for loading, and for disconnecting said loading mechanism from the power shaft when not in use, as when the truck is to run on the road.

Having thus described my invention I claim and desire to secure by Letters Patent:

1. The combination with a truck provided with a power-driven shaft, of a loading frame, means for removably supporting said loading frame in an inclined position overlapping the body of said truck, so as to discharge loose material into the box of said truck and with its lower end adjacent the ground, so as to pick up loose material, an endless conveyor mounted in said frame, driving connections between said power-driven shaft and said conveyor, and means for connecting and disconnecting said driving connections and said shaft.

2. A self-loading truck comprising a body box for holding loose material, a loading frame, an endless conveyor mounted in said frame, means for removably supporting said frame in an inclined position with its upper end overlapping said box, so as to discharge loose material into said box, and with its lower end close to the ground so as to pick up loose material from the ground or floor, means for removably supporting said frame in an inclined position with its upper end approximately on a level with the bottom or platform of said box and also with its lower end close to the ground, disconnectible power-driven means for operating said endless conveyor, and power-driven means, co-operating with said frame, for loading heavy articles; whereby, while the truck is standing still, either loose material or heavy articles may be loaded by power.

3. A self-loading truck comprising a body box for holding loose material, a loading frame, an endless conveyor mounted in said frame, means for removably supporting said frame in an inclined position with its upper end overlapping said box, so as to discharge loose material into said box, and with its lower end close to the ground so as to pick up loose material from the ground or floor, means for removably supporting said frame in an inclined position with its upper end approximately on a level with the bottom or platform of said box and also with its lower end close to the ground, disconnectible power-driven means for operating said endless conveyor, and power-driven means, co-operating with said frame, for loading heavy articles; whereby while the truck is standing still, either loose material or heavy articles may be loaded by power, said body box being spaced above the frame or chassis of said truck to afford transportation storage for said loading frame when not in use.

4. A self-loading truck comprising a power-driven shaft, a loading frame, means for removably supporting said loading frame in an inclined position overlapping the body of said truck, so as to discharge loose material into the box of said truck, and with its lower end close to the ground so as to pick up loose material from the ground or floor, means for removable supporting said frame in an inclined position on said truck with its upper end approximately on a level with the platform on the truck box and also with its lower end close to the ground, power driven means for loading heavy articles when said frame is in its last-named position, an endless conveyor mounted in said frame, and driving connections between said power-driven shaft and said conveyor.

5. The combination with a truck provided with a power-driven shaft, of a loading frame, means for removably supporting said loading frame in an inclined position with its upper end approximately on a level with the platform of the truck body and with its lower end adjacent the ground, and a longitudinally shiftable shaft which may be operatively connected with said power-driven shaft, said shiftable shaft being provided with one or more winch or capstan pulleys for use in loading heavy articles into the truck, while the latter is standing still, by the co-operative use of said loading frame.

6. The combination with a truck provided with a power-driven shaft, of a loading frame provided with an endless conveyor, means for removably supporting said loading frame in an inclined position either with its upper end approximately on a level with the platform of the truck body or with its upper end overlapping the truck body and with its lower end adjacent the ground when in either of the two positions mentioned, and a longitudinally shiftable shaft which may be operatively connected with said power-driven shaft, said shiftable shaft being provided with one or more winch or capstan pulleys for use in loading heavy articles into the truck by the co-operative use of said loading frame, and driving connections between said last-named shaft and said endless conveyor; whereby either heavy articles or loose material may be loaded into said truck.

7. A truck loading frame provided with an endless belt conveyor and with pivotally mounted side-boards adapted to overlap the side edges of said belt conveyor when said side-boards are in working positions, and removable means for maintaining said side-boards in place when in use.

8. A truck loading frame provided with an endless belt conveyor and with pivotally mounted side-boards adapted to overlap the side edges of said belt conveyor when said side-boards are in working positions, and removable means for maintaining said side-boards in place when in use, said removable boards in place when in use, said removable means comprising hinged props, and lugs on which said props may rest.

In testimony whereof I affix my signature.

ARTHUR W. JOHNSON.